US011899852B2

(12) United States Patent
Jang

(10) Patent No.: US 11,899,852 B2
(45) Date of Patent: Feb. 13, 2024

(54) ELECTRONIC DEVICE AND OPERATION METHOD THEREOF

(71) Applicant: Samsung Electronics Co., Ltd., Suwon-si (KR)

(72) Inventor: Youngbae Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/730,599

(22) Filed: Apr. 27, 2022

(65) Prior Publication Data

US 2022/0357803 A1 Nov. 10, 2022

Related U.S. Application Data

(63) Continuation of application No. PCT/KR2022/005709, filed on Apr. 21, 2022.

(30) Foreign Application Priority Data

May 6, 2021 (KR) ........................ 10-2021-0058784

(51) Int. Cl.
*A61B 5/00* (2006.01)
*G06F 3/023* (2006.01)
*G06F 11/34* (2006.01)
*G06N 3/045* (2023.01)

(52) U.S. Cl.
CPC ........ *G06F 3/0233* (2013.01); *G06F 11/3438* (2013.01); *G06N 3/045* (2023.01)

(58) Field of Classification Search
None
See application file for complete search history.

(56) References Cited

U.S. PATENT DOCUMENTS 8,589,149 B2  11/2013  Cecil et al.
8,612,885 B2  12/2013  Kim
9,268,764 B2   2/2016  Cecil et al.
(Continued)

FOREIGN PATENT DOCUMENTS

KR        10-0925043 B1    11/2009
KR    10-2017-0058131 A     5/2017
(Continued)

OTHER PUBLICATIONS

International Search Report dated Aug. 4, 2022, issued in International Patent Application No. PCT/KR2022/005709.

*Primary Examiner* — Carl Adams
(74) *Attorney, Agent, or Firm* — Jefferson IP Law, LLP

(57) ABSTRACT

An electronic device is provided. The electronic device includes an input interface, a memory, and a processor operatively connected to the input interface and the memory. The memory includes instructions that, when are executed by the processor, cause the processor to receive a plurality of key inputs including a first key input, a second key input, and a third key input from a user through the input interface, to recognize whether the received plurality of key inputs correspond to a specified condition, and to determine a key value corresponding to at least one key input among the plurality of key inputs based on a result of learning a key input pattern of the user by using an artificial intelligence model, based on that the received plurality of key inputs correspond to the specified condition.

16 Claims, 8 Drawing Sheets

(56) References Cited

U.S. PATENT DOCUMENTS

| | | | |
|---|---|---|---|
| 9,459,793 | B2 | 10/2016 | Kim |
| 9,612,669 | B2 | 4/2017 | Cecil et al. |
| 9,639,266 | B2 | 5/2017 | Medlock et al. |
| 9,804,687 | B2 | 10/2017 | Kim |
| 10,248,313 | B2 | 4/2019 | Zhai et al. |
| 10,416,885 | B2 | 9/2019 | Medlock et al. |
| 10,671,281 | B2 | 6/2020 | Zhai et al. |
| 10,996,850 | B2 | 5/2021 | Kim et al. |
| 11,256,415 | B2 | 2/2022 | Medlock et al. |
| 2018/0005112 | A1* | 1/2018 | Iso-Sipila ............. G06F 40/274 |
| 2020/0257447 | A1 | 8/2020 | Zhai et al. |
| 2021/0236044 | A1* | 8/2021 | Arroyo-Gallego .. A61B 5/4023 |

FOREIGN PATENT DOCUMENTS

| | | | |
|---|---|---|---|
| KR | 10-2019-0068497 A | | 6/2019 |
| KR | 10-2020-0046192 A | | 5/2020 |
| KR | 10-2021-0033394 A | | 3/2021 |

\* cited by examiner

ELECTRONIC DEVICE AND OPERATION METHOD THEREOF

CROSS-REFERENCE TO RELATED APPLICATION(S)

This application is a continuation application, claiming priority under § 365(c), of an International application No. PCT/KR2022/005709, filed on Apr. 21, 2022, which is based on and claims the benefit of a Korean patent application number 10-2021-0058784, filed on May 6, 2021, in the Korean Intellectual Property Office, the disclosure of which is incorporated by reference herein in its entirety.

TECHNICAL FIELD

The disclosure relates to an electronic device and an operation method thereof.

BACKGROUND ART

An input module such as a keyboard device that receives an input from a user, may decrease a complexity of a circuit structure by using a key matrix in which a plurality of switches are arranged in rows and columns.

The above information is presented as background information only to assist with an understanding of the disclosure. No determination has been made, and no assertion is made, as to whether any of the above might be applicable as prior art with regard to the disclosure.

DISCLOSURE

Technical Problem

Physical keys (e.g., switches) arranged in a matrix structure of rows and columns may be structured to share rows and columns structurally. When the physical keys in a specified physical position are in an on state, a state of the at least one physical key among physical keys adjacent to the physical keys of the on state is actually an off state, but may be recognized as the on state.

Aspects of the disclosure are to address at least the above-mentioned problems and/or disadvantages and to provide at least the advantages described below. Accordingly, an aspect of the disclosure is to provide an electronic device capable of recognizing a key value corresponding to the key input of the user when it is recognized that at least one physical key among the physical keys arranged in a matrix structure is unintentionally turned to an on state by a key input of the user.

Another aspect of the disclosure is to provide an electronic device capable of determining a key value corresponding to a key input of the user, based on a result of learning a key input pattern of the user through an artificial intelligence model.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes an input interface, a memory, and a processor operatively connected to the input and the memory. According to an embodiment, the memory includes instructions that, when are executed by the processor, cause the processor to receive a plurality of key inputs including a first key input, a second key input, and a third key input from a user through the input module, to recognize whether the received plurality of key inputs correspond to a specified condition, and to determine a key value corresponding to at least one key input among the plurality of key inputs based on a result of learning a key input pattern of the user by using an artificial intelligence model, based on that the received plurality of key inputs correspond to the specified condition.

In accordance with another aspect of the disclosure, a method of operating an electronic device is provided. The method includes receiving a plurality of key inputs including a first key input, a second key input, and a third key input from a user through an input module of the electronic device, recognizing whether the received plurality of key inputs correspond to a specified condition, and determining a key value corresponding to at least one key input among the plurality of key inputs based on a result of learning a key input pattern of the user by using an artificial intelligence model, based on that the received plurality of key inputs correspond to the specified condition.

Advantageous Effects

According to various embodiments disclosed in the disclosure, when it is recognized that at least one physical key among the physical keys arranged in a matrix structure is unintentionally is in a on state by a key input of the user, an electronic device capable of recognizing a key value corresponding to a key input provided by a user may be provided.

According to various embodiments disclosed in the disclosure, an electronic device capable of determining a key value corresponding to a key input of a user may be provided based on a result of learning a key input pattern of the user through an artificial intelligence model.

In addition, various effects directly or indirectly identified through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
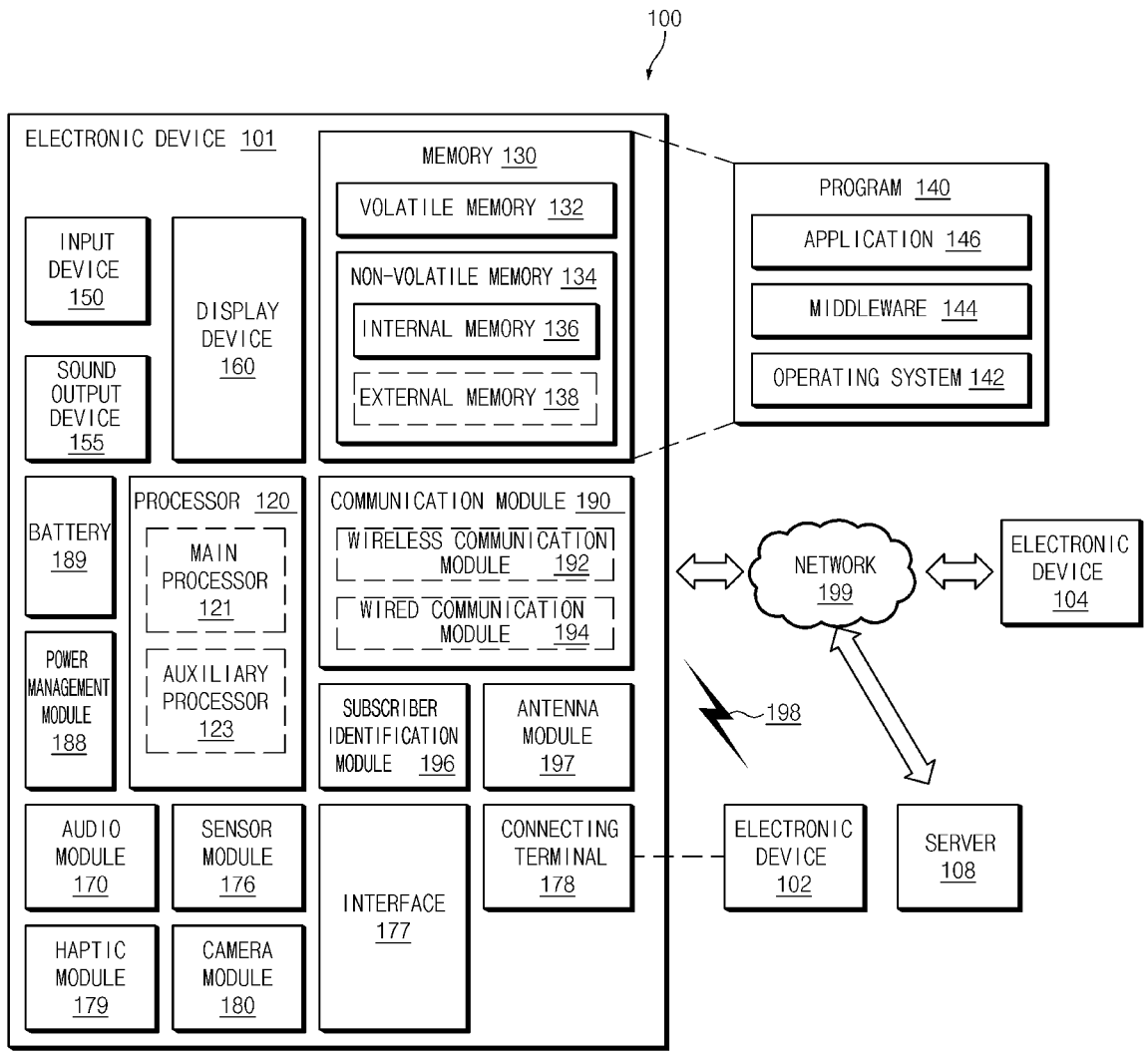
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
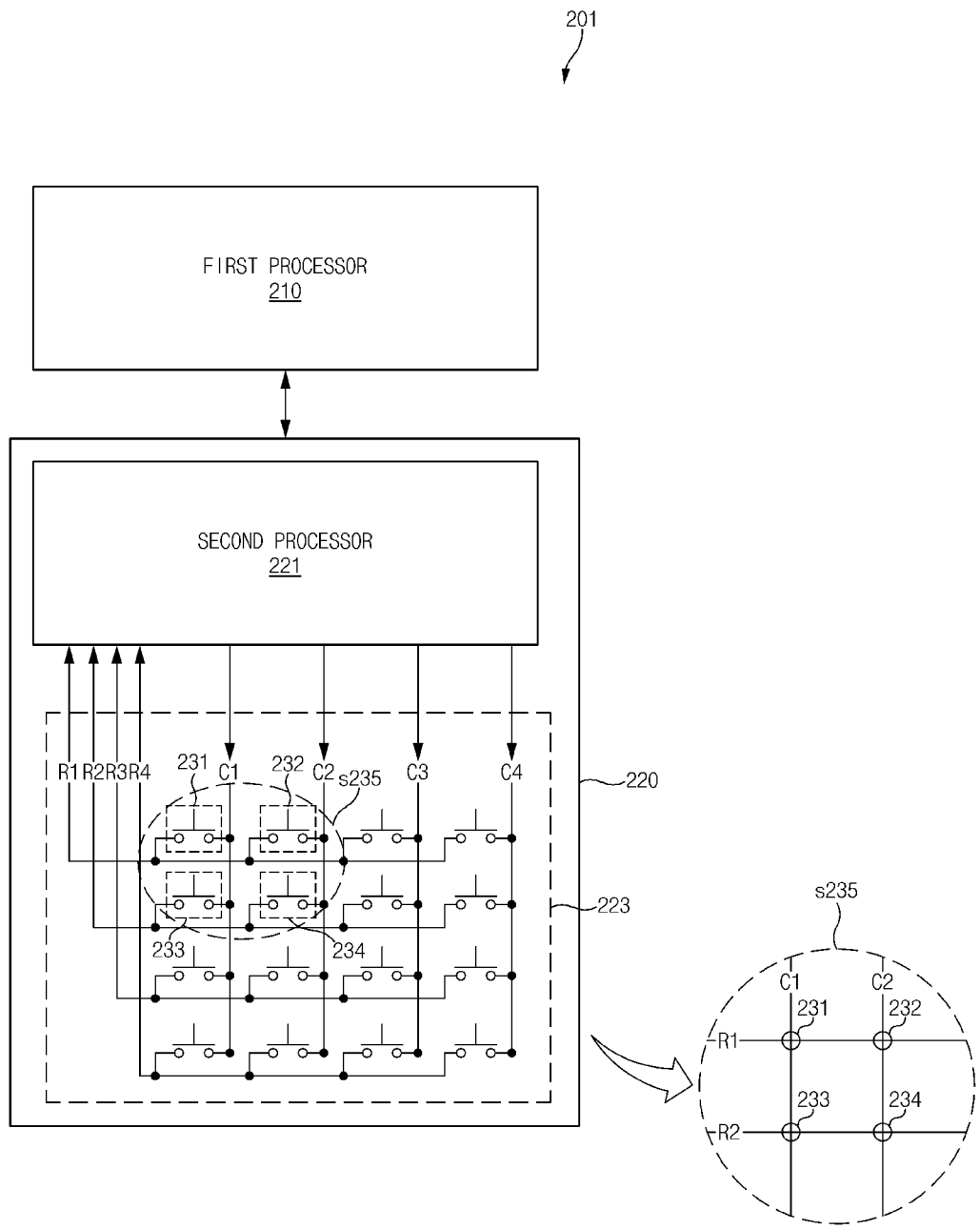
FIG. 2 is a block diagram of an electronic device according to an embodiment of the disclosure.

FIG. 2 is a block diagram of an electronic device according to an embodiment of the disclosure.

According to an embodiment, an electronic device 201 (e.g., the electronic device 101 of FIG. 1) may include a first processor 210 (e.g., the processor 120 of FIG. 1) and an input module 220 (e.g., the input module 150 of FIG. 1).

According to an embodiment, the first processor 210 may include an application processor (AP). For example, the first processor 210 may execute an application installed in the electronic device 201.

According to an embodiment, the input module 220 may include a second processor 221 and a key matrix 223. According to an embodiment, the key matrix 223 may include a plurality of rows R1 to R4, a plurality of columns C1 to C4, and a plurality of physical keys. For example, the plurality of rows R1 to R4 and the plurality of columns C1 to C4 may form an electrical path between the second processor 221 and the key matrix 223. For example, the plurality of rows R1 to R4 and the plurality of columns C1 to C4 may include circuit wires that transfer electrical signals. According to an embodiment, the physical key may control an on or off of an electrical signal (e.g., voltage or current) transferred through the electrical path between the second processor 221 and the key matrix 223. According to an embodiment, the physical key may be configured to electrically connect or electrically separate one of the plurality of rows R1 to R4 and one of the plurality of columns C1 to C4 from each other. For example, the physical key may include at least one switch.

According to an embodiment, the second processor 221 may control the key matrix 223. According to an embodiment, the second processor 221 may input (e.g., applying voltage) the electrical signal to the plurality of columns C1 to C4 connected to the key matrix 223, and may sense the input electrical signal (e.g., voltage) from the plurality of rows R1 to R4. The second processor 221 may determine whether the physical key is turned on or turned off, based on the sensed electrical signal. According to an embodiment, the second processor 221 may transfer (or provide) a key value corresponding to the physical key determined to be on among a plurality of physical keys to the first processor 210. The first processor 210 may recognize a key input corresponding to the transferred key value.

According to an embodiment, the input module 220 may correspond to a keyboard. For example, the second processor 221 may correspond to a keyboard controller that controls a key matrix. In various embodiments, the first processor 210 and the second processor 221 may operate integrally as one component or may operate separately as illustrated in FIG. 2.

In various embodiments, the input module 220 may be embedded in the electronic device 201 or may be included in an external electronic device (not illustrated). According to an embodiment, when the input module 220 is included in the external electronic device, the electronic device 201 including the first processor 210 and the external electronic device may be electrically connected to each other by wire or wirelessly. For example, the electronic device 201 including the first processor 210 and the external electronic device may be connected to each other through a wired interface such as a universal serial bus (USB) or I2C. In another example, when the input module 220 is included in the external electronic device, the electronic device 201 including the first processor 210 and the external electronic device communicate with each other through a wireless interface such as a Bluetooth or a WiFi. In the following descriptions, a case in which the electronic device 201 includes the first processor 210 and the input module 220 will be described as an example. This is for convenience of description, and even when the input module 220 is included in an external electronic device different from the electronic device 201, the following descriptions may be applied the same or similarly.

Referring to FIG. 2, a schematic diagram s235 is a diagram schematically illustrating a part of the key matrix 223. According to an embodiment, the first processor 210 may obtain (or receive) a plurality of key inputs from a user of the electronic device 201 through the input module 220. For example, the first processor 210 may obtain a plurality of key inputs input by the user through the keyboard. According to an embodiment, the first processor 210 may obtain a first key input, a second key input, and a third key input provided by the user through the input module 220. Referring to the schematic diagram s235, first to fourth physical keys 231, 232, 233, and 234 may be positioned on electrical paths in which two rows R1 and R2 of the plurality of rows R1, R2, R3, and R4 and two columns C1 and C2 of the plurality of columns C1, C2, C3, and C4 cross each other. For example, the first to fourth physical keys 231, 232, 233, and 234 may be switches that are positioned at rectangular points formed by crossing two rows R1 and R2 and two columns C1 and C2. According to an embodiment, when a user of the electronic device 201 inputs a plurality of frequently used key inputs through the input module 220, the plurality of key inputs provided by the user may correspond to a specified condition. For example, when a user inputs a plurality of key inputs in a frequently input pattern to the input module 220, the user may continuously input key inputs without releasing the hand from the physical key. For example, by a key inputs of the user, all three the physical keys among the physical keys (or switches) positioned at rectangular points formed by crossing the two rows R1 and R2 and the two columns C1 and C2 may be in an on state. In this case, the input module 220 may determine a key value corresponding to at least one key input among the plurality of key inputs received from a user by using an artificial intelligence model. The input module 220 may provide the determined key value to the first processor 210. Hereinafter, when the plurality of key inputs received from the user correspond to a specified condition, an embodiment in which a key value is determined using the artificial intelligence model will be described.

According to an embodiment, the input module 220 may receive a first key input from the user. For example, the first physical key 231 may change from an off state to an on state, based on that the user provides the first key input. For example, the user may physically press the first physical key 231 to contact a switch corresponding to the first physical key 231. According to an embodiment, the second processor 221 may identify the electrical signal transferred through the first column C1 through the first row R1 and then may recognize that the first physical key 231 is in the on state. The second processor 221 may obtain a first key value corresponding to the first physical key 231 having the on state, and may transfer the obtained first key value to the first processor 210. The first processor 210 may recognize the first key input based on the received first key value.

According to an embodiment, the input module 220 may receive a second key input from the user. For example, the second processor 221 may receive the second key input while the first physical key 231 is in the on state. According to an embodiment, the second physical key 232 may change from an off state to an on state based on that the user provides the second key input. For example, the user may physically press the second physical key 232 to contact a switch corresponding to the second physical key 232. According to an embodiment, the second processor 221 may identify the electrical signal transferred through the second column C2 through the first row R1 and then may recognize that the second physical key 232 is in an on state. The second processor 221 may obtain a second key value corresponding to the second physical key 232 having the on state, and may transfer the obtained second key value to the first processor 210. The first processor 210 may recognize the second key input based on the received second key value.

According to an embodiment, the input module 220 may receive a third key input from the user. For example, the user may provide a third key input to the input module 220 with the intention of inputting a third key value corresponding to the third physical key 233. According to an embodiment, the second processor 221 may receive the third key input while both the first physical key 231 and the second physical key 232 are in the on state. According to an embodiment, the third physical key 233 may change from the off state to the on state based on that the user provides the third key input. For example, the user may physically press the third physical key 233 to contact a switch corresponding to the third physical key 233.

According to an embodiment, the fourth physical key 234 may be a physical key that is connected to rows (e.g., the first row R1 and the second row R2) shared by the first to third physical keys 231, 232, and 233 and columns (e.g., the first column C1 and the second column C2) shared by the first to third physical keys 231, 232, and 233. According to an embodiment, when the first to third physical keys 231, 232, and 233 are in the on state, the second processor 221 may also recognize that the fourth physical key 234 is in the on state due to a structure of the key matrix. For example, when the first to third physical keys 231, 232, and 233 are in the on state, the second processor 221 may recognize the electrical signal input to the second column C2 through the second row R2 even when the fourth physical key 234 is turned off. The second processor 221 may recognize that the fourth physical key 234 is in the on state by recognizing the electrical signal input to the second column C2 through the second row R2.

According to one embodiment, while the first physical key 231 and the second physical key 232 are in the on state, the second processor 221 may recognize that the remaining one physical key is also in the on state, when one (e.g., the third physical key 233 or the fourth physical key 234) of the other physical keys connected to the row and the column that are shared by the first physical key 231 and the second physical key 232 is turned on. For example, while the first physical key 231 and the second physical key 232 are in the on state, the third physical key 233 may be in the on state by providing a third input by the user. In this case, the second processor 221 may recognize that the fourth physical key 234 is also in the on state due to the physical arrangement of the key matrix 223. According to an embodiment, the second processor 221 may not recognize that which key value of a key value corresponding to the third physical key 233 or a key value corresponding to the fourth physical key 234 is the key value corresponding to the third input. For example, when the third physical key 233 is changed to the on state, the second processor 221 may recognize that the fourth physical key 234 is also in the on state due to the matrix structure. In this case, the second processor 221 may not recognize an intention as to whether the user intends to input a key value corresponding to which of the third physical key 233 or the fourth physical key 234. For example, the above-described situation may be referred to as a ghost phenomenon. In one embodiment, after the first key input corresponding to the first physical key 231 and the second key input corresponding to the second physical key 232 are input, although it is described as an example that the third key input corresponding to the third physical key 233 is input, the order in which the key inputs are input is not limited thereto. In various examples, three of the four physical keys that are determined by two rows among the plurality of rows R1 to R4 and by two columns among the plurality of columns C1 to C4 may be simultaneously in the on state. In this case, the second processor 221 may recognize that the other one of the physical keys is in the on state even though that key is actually in the off state.

According to an embodiment, the second processor 221 may determine (or recognize) a key value corresponding to the key input provided by the user by learning the key input pattern of the user through the artificial intelligence model. For example, while the first physical key 231 and the second physical key 232 are in the on state, the second processor 221 may receive a user input that inputs one of the third physical key 233 or the fourth physical key 234. The second processor 221 may determine one of a key value (e.g., the third key value) corresponding to the third physical key 233 or a key value (e.g., the fourth key value) corresponding to the fourth physical key 234, based on the received user input, by using the artificial intelligence model. In various embodiments, when three physical keys of the first to fourth physical keys 231, 232, 233, and 234 are turned on, to prevent the other one physical key from being recognized as being in the on state as well, the key matrix 223 may further include a diode. According to an embodiment, the second processor 221 may obtain a key value corresponding to a user input, based on a result of learning using the artificial intelligence model. When the second processor 221 obtains the key value using the artificial intelligence model, circuit complexity may be reduced compared to adding a diode for each physical key. According to various embodiments, while the first physical key corresponding to the first key input is in the on state and the second physical key corresponding to the second key input is in the on state, the second processor 221 may receive the third key input again from the user, by ignoring the received third key input. According to an embodiment, the second processor 221 may determine the third key value corresponding to the third key input by using the key input pattern of the user without ignoring the third key input. According to an embodiment, the second processor 221 may determine a third key value corresponding to the third key input by using the key input pattern of the user without receiving the third key input again from the user. According to an embodiment, the second processor 221 may improve user convenience. In various embodiments, the first processor 210 may operate integrally with the second processor 221. In this case, the first processor 210 may determine a key value corresponding to the key input provided by the user using the artificial intelligence model.

Figure 3:
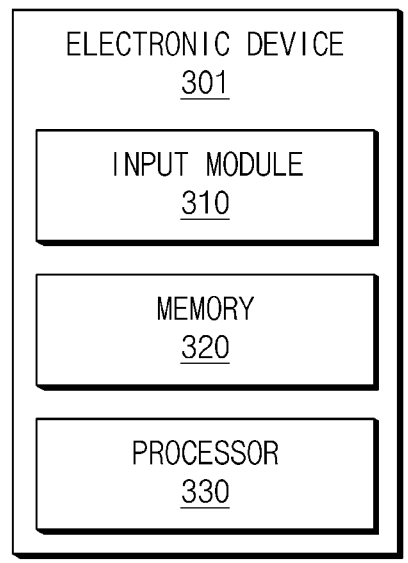
FIG. 3 is a block diagram of an electronic device according to an embodiment of the disclosure.

FIG. 3 is a block diagram of an electronic device according to an embodiment of the disclosure.

Referring to FIG. 3, according to an embodiment, an electronic device 301 (e.g., the electronic device 101 of FIG. 1 or the electronic device 201 of FIG. 2) may include an input module 310 (e.g., the input module 150 of FIG. 1 or the input module 220 of FIG. 2), a memory 320 (e.g., the memory 130 of FIG. 1), and a processor 330 (e.g., the processor 120 of FIG. 1 and/or the first processor 210 or the second processor 221 of FIG. 2).

According to an embodiment, the input module 310 may include a key matrix (e.g., the key matrix 223 of FIG. 2) that receives a key input from the user. For example, the key matrix may include a plurality of physical keys. For example, the physical key may include a switch that controls a transfer of an electrical signal. According to an embodiment, the input module 310 may be configured to perform a function related to a key input among functions of the electronic device 301. For example, the input module 310 may include an auxiliary processor (e.g., the second processor 221 of FIG. 2) that performs a function related to key input. The input module 310 may sense a key input received from the user through the auxiliary processor and may provide a key value corresponding to the sensed key input to the processor 330. The input module 310 may sense that the key input received from the user corresponds to a specified condition. The input module 310 may determine a key value corresponding to at least one key input from among the received key inputs, based on that the received key input corresponds to a specified condition. The input module 310 may provide the determined key value to the processor 330. In an embodiment, the input module 310 may be a keyboard included in the electronic device 301. In another example, the input module 310 may be included in an external electronic device configured to be connected to the electronic device 301 by wire or wirelessly.

According to an embodiment, the input module 310 may receive a plurality of key inputs from the user. The input module 310 may provide the plurality of key inputs received from the user to the processor 330. According to an embodiment, the processor 330 may learn the key input pattern of the user using a plurality of key inputs received from the user.

According to an embodiment, the input module 310 may recognize that a plurality of key inputs received from the user correspond to a specified condition. In one embodiment, the input module 310 may recognize that the plurality of key inputs received from the user correspond to a plurality of physical keys designated by two rows and two columns connected to the key matrix. For example, the input module 310 may recognize that three physical keys among four physical keys designated by two rows and two columns connected to the key matrix are in the on state, based on the plurality of sequentially received key inputs. According to an embodiment, when the three physical keys corresponding to the three key inputs sequentially received are turned on at the same time, the input module 310 may recognize that the specified condition is satisfied. The specified condition may correspond to a case where the key inputs received from the user are key inputs that cause three physical keys among four physical keys sharing two rows and two columns to be in the on state. For example, the specified condition may be a case in which a key input received from the user corresponds to key inputs causing the ghost phenomenon.

According to an embodiment, the input module 310 may determine a key value corresponding to at least one key input among the plurality of key inputs, based on that the received plurality of key inputs correspond to the specified condition (e.g., when a key input causing the ghost phenomenon is detected).

According to an embodiment, the input module 310 may provide a key input pattern of the user of a state in which the specified condition does not occur (e.g., a normal state) to the processor 330, and may allow the processor 330 to learn the key input pattern of the user using the artificial intelligence model (e.g., the first artificial intelligence model). For example, the artificial intelligence model may include a recurrent neural network (RNN) model.

According to an embodiment, the input module 310 may receive, from the processor 330, a weight generated as a result of learning the key input pattern of the user before the specified condition occurs by using the artificial intelligence model. The input module 310 may determine a key value corresponding to at least one key input among the plurality of key inputs by using the received weight. For example, the at least one key input may correspond to a third key input of the user causing the ghost phenomenon. According to an embodiment, the input module 310 may determine a key value corresponding to at least one key input, by using the weight received from the processor 330 and the artificial intelligence model (e.g., a second artificial intelligence model). For example, the artificial intelligence model may include the recurrent neural network (RNN) model.

According to an embodiment, when key inputs corresponding to a specified condition are sensed, the input module 310 may determine a key value corresponding to a third key input from among a plurality of key inputs by using the recurrent neural network model. The input module 310 may transfer the determined key value to the processor 330. The processor 330 may recognize a key value corresponding to the key input of the user (e.g., the key input of the user causing the ghost phenomenon) as the key value received from the input module 310.

According to an embodiment, the memory 320 may store at least one program, application, data, or instructions executed by the processor 330 or the input module 310. According to an embodiment, the memory 320 may include at least a portion of the memory 130 illustrated in FIG. 1. According to an embodiment, the memory 320 may store information or instructions for performing at least a part of an operation of the electronic device 301 to be described later. According to an embodiment, the memory 320 may store instructions related to a plurality of applications executed by the processor 330.

According to an embodiment, the processor 330 may be operatively connected to other components of the electronic device 301 and may control various operations of the electronic device 301. The processor 330 may perform various operations of the electronic device 301 by executing one or more instructions stored in the memory 320. Hereinafter, operations described as being performed by the electronic device 301 may be referred to as being performed by the processor 330.

According to an embodiment, the processor 330 may recognize a key input provided by the user through the input module 310. According to an embodiment, the processor 330 may receive a key value corresponding to a key input received from the user from the input module 310. The processor 330 may recognize a key input based on the received key value.

According to an embodiment, the processor 330 may learn the key input pattern of the user using the artificial intelligence model. As a result of learning the key input pattern of the user using the artificial intelligence model, the processor 330 generates a weight for determining a key value corresponding to the key input of the user when the key input of the user corresponds to the specified condition. For example, the processor 330 may generate a weight for determining a key value corresponding to the key input of the user (e.g., a third key input entered when the three physical keys corresponding to sequentially input three key inputs among the physical keys sharing two rows and two columns are simultaneously in the on state) causing the ghost phenomenon. According to an embodiment, the processor 330 may provide the generated weight to the input module 310.

In various embodiments, when the processor 330 integrally performs a function related to the key input, the above-described operation of the input module 310 may be performed by the processor 330. For example, the processor 330 may recognize that a plurality of key inputs received from the user correspond to a specified condition, and may determine a key value corresponding to at least one key input among the plurality of key inputs by using the artificial intelligence model.

Figure 4A:
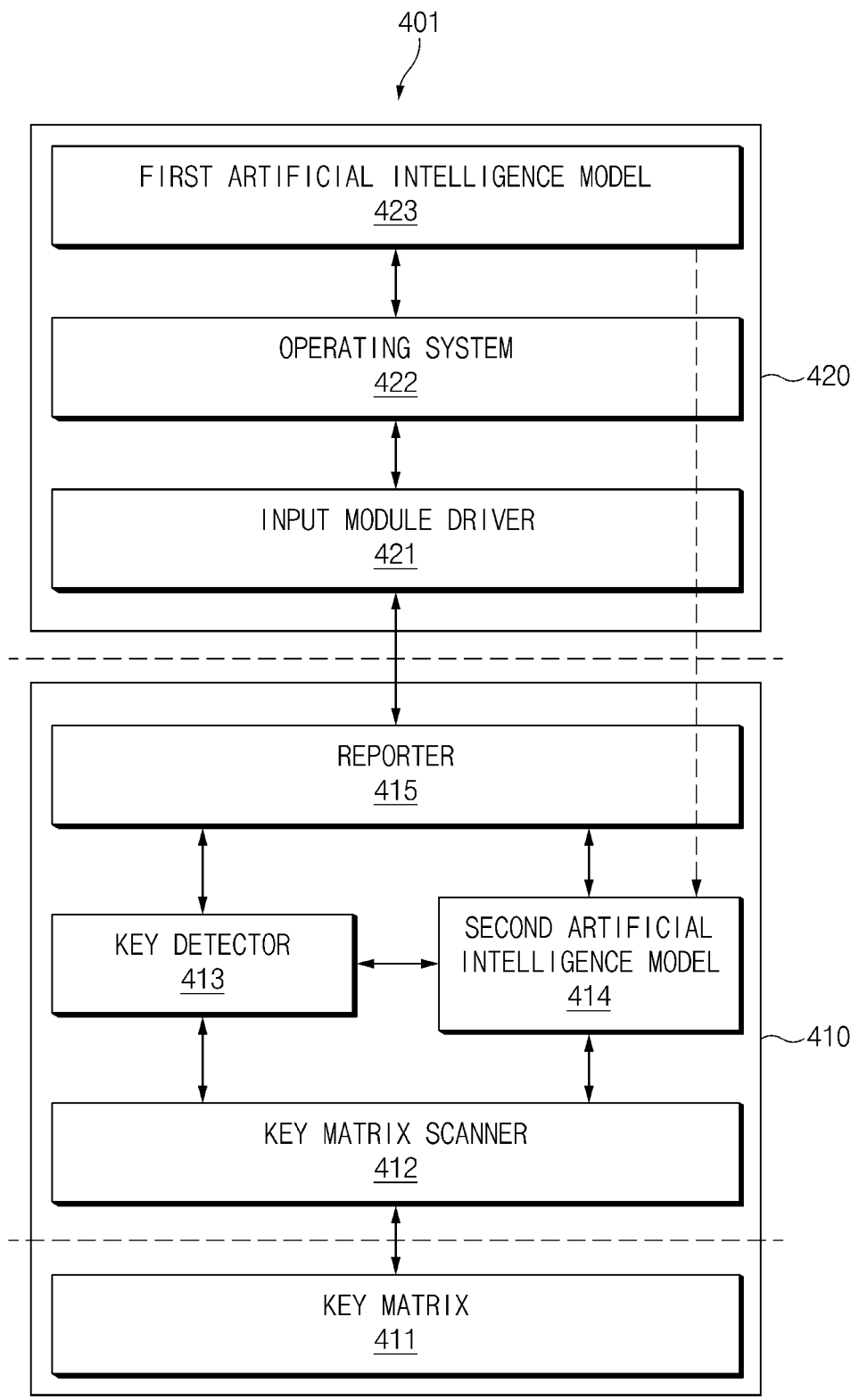
FIG. 4A is a block diagram of an electronic device according to an embodiment of the disclosure.

FIG. 4A is a block diagram of an electronic device according to an embodiment of the disclosure.

Referring to FIG. 4A, an electronic device 401 (e.g., the electronic device 101 of FIG. 1, the electronic device 201 of FIG. 2, or the electronic device 301 of FIG. 3) may include an input module 410 (e.g., the input module 150 of FIG. 1, the input module 220 of FIG. 2 or the input module 310 of FIG. 3) and a processor 420 (e.g., the processor 120 of FIG. 1, the first processor 210 or the second processor 221 of FIG. 2, or the processor 330 of FIG. 3). According to an embodiment, components of the electronic device 401 illustrated in FIG. 4A may be software modules including the one or more instructions stored in a memory (e.g., the memory 130 of FIG. 1 or the memory 320 of FIG. 3) included in the electronic device 401. For example, the software modules may be executed by the processor 420 and/or a processor (e.g., the second processor 221 of FIG. 2) included in the input module 410. According to an embodiment, at least one of the components may be implemented using a physical hardware module, logic, a logic block, or circuit.

In one embodiment, the input module 410 may include a key matrix 411 (e.g., the key matrix 223 of FIG. 2), a key matrix scanner 412, a key detector 413, a second artificial intelligence model 414, and a reporter 415. In an embodiment, at least some of the components of the input module 410 may be included in the second processor 221 of FIG. 2. In an embodiment, the processor 420 may include an input module driver 421, operating system 422, and a first artificial intelligence model 423. In an embodiment, at least some of the components of the processor 420 may be included in the first processor 210 of FIG. 2. According to various embodiments, at least some of the components illustrated in FIG. 4A may be omitted, or two or more components may operate integrally.

According to an embodiment, the key matrix 411 may receive a key input from a user. For example, the key matrix 411 may include a plurality of rows, a plurality of columns, and a plurality of physical keys. The plurality of physical keys may be arranged in a matrix structure, and one physical key of the plurality of physical keys may be configured to be connected to one row of the plurality of rows and one column of the plurality of columns. According to an embodiment, the physical key may control a turned on or a turned off of an electrical signal that is transferred through an electrical path formed through one of a plurality of rows and one of a plurality of columns. For example, the physical key may include a switch.

According to an embodiment, the key matrix scanner 412 may sense a physical key corresponding to a key input received from the user. For example, the user may provide the key input by physically pressing the physical key. According to an embodiment, the key matrix scanner 412 may input an electrical signal to one of a plurality of columns, and may recognize a row in which the electrical signal is sensed from among the plurality of rows. The key matrix scanner 412 may sense that a physical key connected to the row in which the electrical signal is sensed is in the on state.

According to an embodiment, the reporter 415 may provide the key value corresponding to an on-state physical key detected by the key matrix scanner 412 to the input module driver 421. According to an embodiment, when a key input corresponding to a condition specified by the key detector 413 is sensed, the reporter 415 may provide a key value corresponding to the key input determined through the second artificial intelligence model 414 to the input module driver 421.

According to an embodiment, the key detector 413 may recognize (or detect) that the key input received from the user corresponds to a specified condition. For example, the specified condition may be a case in which a key input received from a user corresponds to key inputs causing the ghost phenomenon. According to one embodiment, the key detector 413 may recognize that a plurality of key inputs sequentially received from the user correspond to a key input that puts the three physical keys among the four physical keys designated by two rows and two columns connected to the key matrix to be in the on state.

According to an embodiment, when the key detector 413 recognizes that the key input received from the user corresponds to the specified condition, the second artificial intelligence model 414 may determine a key value corresponding to at least one key input among the key inputs. According to an embodiment, when the three physical keys among the four physical keys designated by two rows and two columns connected to the key matrix are in the on state, the second artificial intelligence model 414 may determine a key value corresponding to the third received key input. According to an embodiment, the second artificial intelligence model 414 may obtain a weight generated by the first artificial intelligence model 423 learning the key input pattern in a normal state of the user (e.g., a state in which a key input corresponding to a specified condition is not received). When a key input (e.g., a key input that causes a ghost phenomenon) corresponding to a specified condition is sensed, the second artificial intelligence model 414 may determine a key value corresponding to the third key input (e.g., a key input that causes the ghost phenomenon) received from the user using the obtained weight. The second artificial intelligence model 414 may provide the determined key value to the reporter 415. The second artificial intelligence model 414 may determine the key value based on the key input pattern of the user without receiving a key input from the user again to determine the key value.

According to an embodiment, the input module driver 421 may control the input module 410. For example, the input module driver 421 may receive a key value corresponding to a key input from the reporter 415. The input module driver 421 may provide the received key value to the operating system 422.

According to an embodiment, the operating system 422 may allow the processor 420 to be operated by using a key value corresponding to a key input provided by the user. For example, the operating system 422 may allow the processor 420 to perform various operations, based on the key value received from the input module driver 421.

According to an embodiment, the first artificial intelligence model 423 may learn the key input pattern of the user using the key inputs of the user. For example, the first artificial intelligence model 423 may perform learning by using a key value corresponding to a key input of the user in a normal time (e.g., a normal state). For example, the key input of the user in the normal time (e.g., the normal state) may be a key input (or a key input that does not cause the ghost phenomenon) that does not correspond to a specified condition. For example, the first artificial intelligence model 423 may learn a key input pattern of the user (e.g., frequently used key inputs or an input sequence of frequently used key inputs). According to an embodiment, the first artificial intelligence model 423 may generate a weight for determining a key value corresponding to a key input, based on the key input pattern of the user in the normal time. For example, when the key input of the user corresponds to the specified condition, the first artificial intelligence model 423 may generate a weight for determining a key value corresponding to the key input of the user. The first artificial intelligence model 423 may provide the generated weight to the second artificial intelligence model 414. In various embodiments, the first artificial intelligence model 423 may be included in an on-board machine learning module that operates within the electronic device 401 or may be included in an external electronic device (e.g., an external server). Alternatively, the first artificial intelligence model 423 may be integrally executed with the second artificial intelligence model 414.

According to an embodiment, when the input module 410 is included in an external electronic device other than the electronic device 401, the external electronic device may be connected (plug in) to the electronic device 401 by wire or may be connected wirelessly through a wireless interface. The first artificial intelligence model 423 may be executed to learn a key input pattern of the user when the input module 410 is wired and/or wirelessly connected to the electronic device 401. When the connection between the input module 410 and the electronic device 401 is cut off, the first artificial intelligence model 423 may be stopped.

According to an embodiment, the input module 410 may learn a key input pattern for each user based on user account information. For example, when the input module 410 is wired and/or wirelessly connected to the electronic device 401 (or the processor 420), the input module 410 may provide a user-specific value representing the user of the input module 410 to the processor 420. The processor 420 may cause the first artificial intelligence model 423 to learn the key input pattern of the user divided for each user, based on the received user-specific value. For example, the processor 420 may include a plurality of first artificial intelligence models (not illustrated) that are distinguished based on the user (or user account information). The processor 420 may select one of the plurality of first artificial intelligence models based on the user-specific value, and may learn the key input pattern of the corresponding user by using the selected first artificial intelligence model.

Figure 4B:
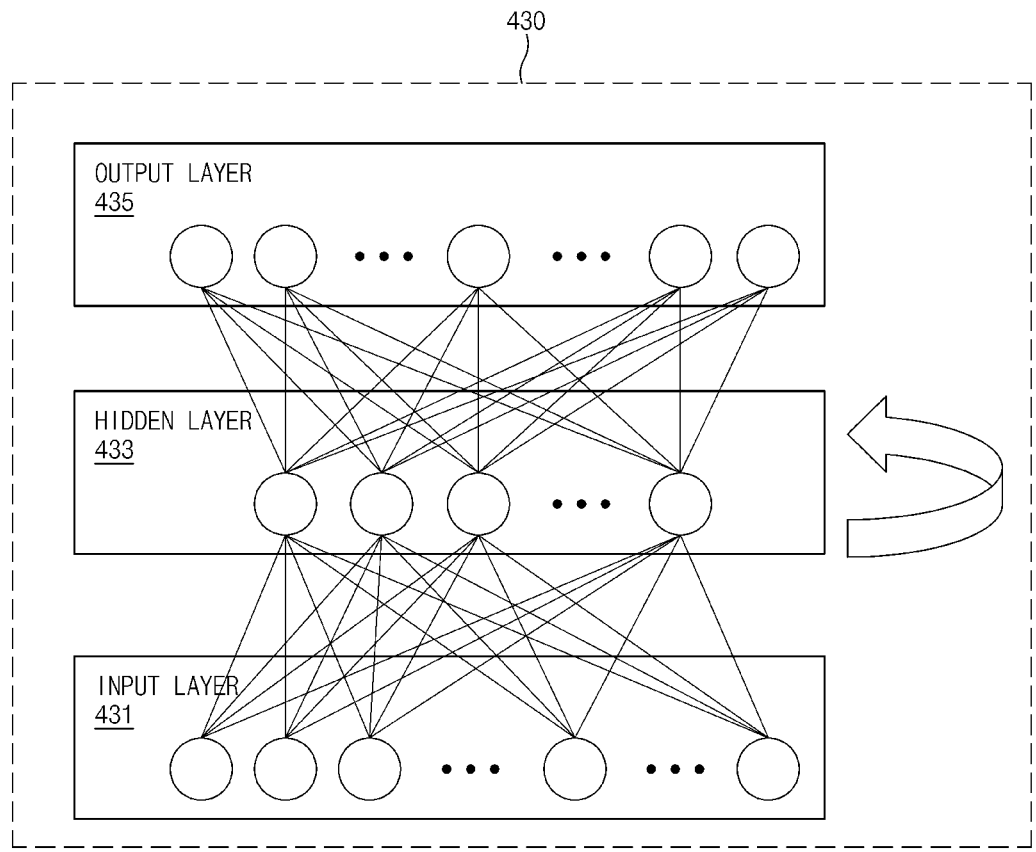
FIG. 4B illustrates a recurrent neural network (RNN) model among artificial intelligence models, according to an embodiment of the disclosure.

FIG. 4B illustrates a recurrent neural network (RNN) model among artificial intelligence models, according to an embodiment of the disclosure. The first artificial intelligence model 423 and the second artificial intelligence model 414 illustrated in FIG. 4A may include a recurrent neural network model 430 of FIG. 4B.

Referring to FIG. 4B, according to an embodiment, the recurrent neural network model 430 may include an input layer 431, a hidden layer 433, and an output layer 435.

According to an embodiment, the input layer 431 may receive key inputs of the user. According to an embodiment, the hidden layer 433 may learn an input habit by using the key inputs of the user. According to an embodiment, the output layer 435 may determine a key value corresponding to the key input of the user, based on the learned input habit of the user.

According to an embodiment, the first artificial intelligence model 423 may learn a key input pattern of the user in a normal time (e.g., a normal state) by using the recurrent neural network model 430. Since the first artificial intelligence model 423 continuously learns the key input pattern of the user, the amount of learning data may be large. According to an embodiment, the first artificial intelligence model 423 may generate a weight for determining a key value corresponding to the key input when the key input of the user corresponds to a specified condition. The first artificial intelligence model 423 may output the generated weight through the output layer 435.

According to an embodiment, when the key input of the user corresponds to a specified condition, the second artificial intelligence model 414 may determine a key value corresponding to the key input. According to an embodiment, the second artificial intelligence model 414 may receive a weight from the first artificial intelligence model 423. According to an embodiment, the weight of the hidden layer 433 included in the second artificial intelligence model 414 may be set to a value corresponding to the weight received from the first artificial intelligence model 423. For example, a weight received from the first artificial intelligence model 423 may be applied (or reflected) to the hidden layer 433 included in the second artificial intelligence model 414. According to an embodiment, the second artificial intelligence model 414 may learn a key input of the user corresponding to a specified condition using the set (or applied) weight. As a result of learning the key input of the user corresponding to the specified condition, the second artificial intelligence model 414 may determine a key value corresponding to the key input. For example, when three physical keys among four physical keys sharing two rows and two columns are turned on in response to a plurality of key inputs from a user, the second artificial intelligence model 414 may determine a key value corresponding to the third key input, based on the learning result. According to various embodiments, the electronic device 401 determines a key value corresponding to a key input of the user using an artificial intelligence model, so that the complexity of circuit implementation due to an additional electrical element (e.g., diode) may not be increased. In addition, the electronic device 401 may improve user convenience by determining a key value corresponding to the key input of the user using an artificial intelligence model without re-receiving the key input from the user.

An electronic device (e.g., the electronic device 101 of FIG. 1, the electronic device 201 of FIG. 2, the electronic device 301 of FIG. 3, or the electronic device 401 of FIGS. 4A and 4B) according to an embodiment of the disclosure may include an input module (e.g., the input module 150 of FIG. 1, the input module 220 of FIG. 2, the input module 310 of FIG. 3, or the input module 410 of FIGS. 4A and 4B), a memory (e.g., the memory 130 of FIG. 1 or the memory 320 of FIG. 3), and a processor (e.g., the processor 120 of FIG. 1, the first processor 210 or the second processor 221 of FIG. 2, the processor 330 of FIG. 3, or the processor 420 of FIG. 4A) operatively connected to the input module and the memory. According to an embodiment, the memory includes instructions that, when are executed by the processor, cause the processor to receive a plurality of key inputs including a first key input, a second key input, and a third key input from a user through the input module, to recognize whether the received plurality of key inputs correspond to a specified condition, and to determine a key value corresponding to at least one key input among the plurality of key inputs based on a result of learning a key input pattern of the user by using an artificial intelligence model, based on that the received plurality of key inputs correspond to the specified condition.

According to an embodiment, the input module may include a plurality of physical keys that are arranged in a matrix form including a plurality of rows and a plurality of columns.

According to an embodiment, the instructions may cause the processor to recognize that key inputs correspond to the specified condition, when the first key input, the second key input, and the third key input are the key inputs corresponding to three physical keys among four physical keys designated by a first row and a second row of the plurality of rows and a first column and a second column of the plurality of columns.

According to an embodiment, the plurality of physical keys may include a first physical key, a second physical key, a third physical key, and a fourth physical key, and the instructions may cause the processor to obtain a first key value corresponding to the first physical key based on that the first physical key corresponding to the first key input is turned on, to obtain a second key value corresponding to the second physical key based on that the second physical key corresponding to the second key input is turned on in a state in which the first physical key is turned on, to recognize that key inputs correspond to the specified condition based on that the third physical key corresponding to the third key input is turned on in a state in which the first physical key and the second physical key are turned on, and to determine the key value corresponding to the third key input based on the result of learning using the artificial intelligence model, among a third key value corresponding to the third physical key or a fourth key value corresponding to the fourth physical key.

According to an embodiment, each of the first physical key, the second physical key, the third physical key, and the fourth physical key may include a switch that controls electrical signals transferred through two rows selected from among the plurality of rows and two columns selected from among the plurality of columns.

According to an embodiment, the artificial intelligence model may include a recurrent neural network (RNN) model.

According to an embodiment, the instructions may cause the processor to determine a key value corresponding to a third received key input among the first key input, the second key input, and the third key input, based on the result of learning using the artificial intelligence model.

According to an embodiment, the instructions may cause the processor to determine the key value, based on the result of learning using the artificial intelligence model, without re-receiving the at least one key input from the user.

According to an embodiment, the artificial intelligence model may include a first artificial intelligence model and a second artificial intelligence model, and the instructions cause the processor to learn the key input pattern of the user by using the first artificial intelligence model, to generate a weight related to the specified condition, based on a result of learning using the first artificial intelligence model, and to determine the key value corresponding to the at least one key input through the second artificial intelligence model to which the generated weight is applied.

According to an embodiment, the instructions may cause the processor to generate a weight based on the result of learning the key input pattern of the user by using the artificial intelligence model, to provide the generated weight to an external electronic device, and to receive the key value from the external electronic device, and the key value may be a value determined based on the result of learning the plurality of key inputs by using the artificial intelligence model included in the external electronic device and to which the weight is applied.

Figure 5:
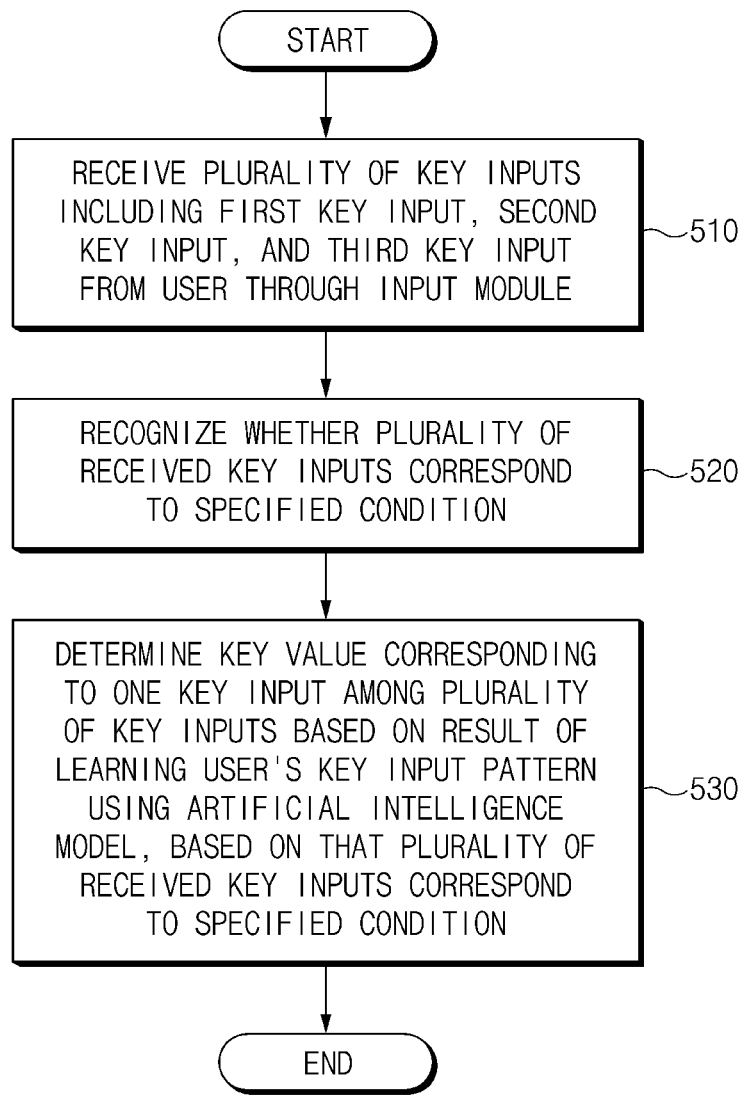
FIG. 5 is a flowchart of a method of operating an electronic device, according to an embodiment of the disclosure.

FIG. 5 is a flowchart illustrating a method of operating an electronic device, according to an embodiment of the disclosure.

Referring to FIG. 5, according to an embodiment, in operation 510, an electronic device (e.g., the electronic device 101 of FIG. 1, the electronic device 201 of FIG. 2, the electronic device 301 of FIG. 3, or the electronic device 401 of FIGS. 4A and 4B) may receive a plurality of key inputs including a first key input, a second key input, and a third key input from the user through an input module (e.g., the input module 150 of FIG. 1, the input module 220 of FIG. 2, the input module 310 of FIG. 3, or the input module 410 of FIGS. 4A and 4B). For example, the key input may correspond to an input in which the user physically presses a physical key of the input module. According to an embodiment, the input module may include a key matrix including a plurality of rows, a plurality of columns, and a plurality of physical keys. The plurality of rows and the plurality of columns may correspond to circuit wirings for transferring electrical signals. Each of the plurality of physical keys may be configured to be connected to one row of the plurality of rows and one column of the plurality of columns. For example, the physical key may include a switch configured to turn on or off an electrical signal transferred through an electrical path, and the electrical path may be formed by one row of the plurality of rows and one column of the plurality of columns.

According to an embodiment, in operation 520, the electronic device may recognize whether a plurality of received key inputs correspond to a specified condition. For example, the specified condition may correspond to a case in which a plurality of received key inputs are key inputs causing a ghost phenomenon.

According to an embodiment, by a plurality of key inputs received from a user, three physical keys of four physical keys designated by two rows of a plurality of rows and two columns of a plurality of columns may be in the on state. In this case, the electronic device may recognize that the received plurality of key inputs correspond to the specified condition.

According to an embodiment, in operation 530, based on that the received plurality of key inputs correspond to the specified condition, the electronic device may determine a key value corresponding to at least one key input among the plurality of key inputs, based on a result of learning the key input pattern of the user using the artificial intelligence model. According to an embodiment, when the received plurality of key inputs correspond to inputs (e.g., inputs that cause the three physical keys to be in an on state) for pressing three physical keys among the four physical keys, the electronic device may determine a key value corresponding to a third key input last (e.g., a third input) input based on an input order among the first key input to the third key input. The electronic device may use the artificial intelligence model to determine a key value corresponding to the third key input. For example, the artificial intelligence model may include a recurrent neural network model. The electronic device may determine a key value corresponding to the third key input, based on a result of learning a usual key input pattern of the user through the artificial intelligence model. The electronic device may determine a key value corresponding to the third key input based on a result of learning the key input pattern of the user without requesting the user to input at least one key again.

Figure 6:
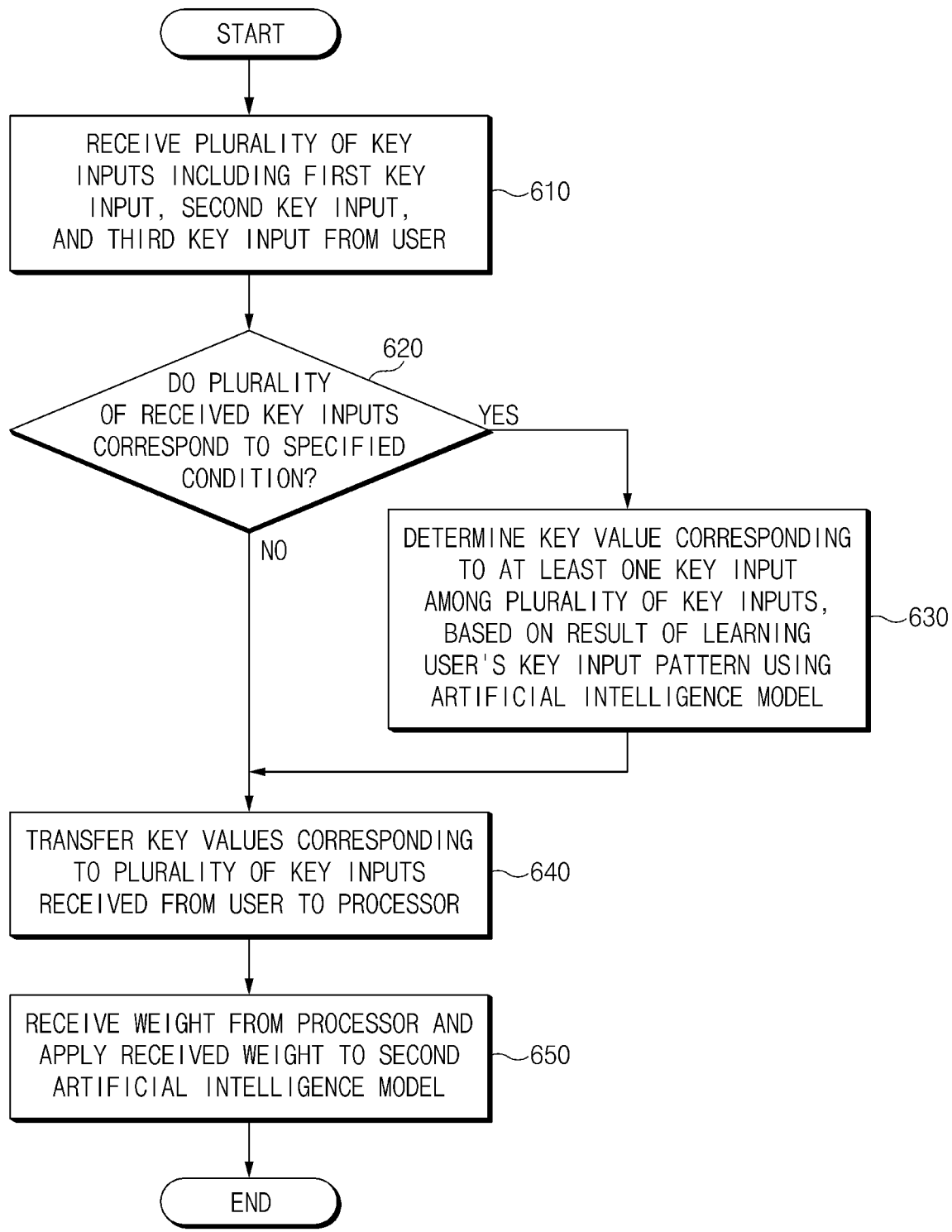
FIG. 6 is a flowchart illustrating a method of operating an input module of an electronic device, according to an embodiment of the disclosure.

FIG. 6 is a flowchart of a method of operating an input module of an electronic device, according to an embodiment of the disclosure.

Referring to FIG. 6, according to an embodiment, in operation 610, an input module (e.g., the input module 150 of FIG. 1, the input module 220 of FIG. 2, the input module 310 of FIG. 3, or the input module 410 of FIGS. 4A and 4B) of an electronic device (e.g., the electronic device 101 of FIG. 1, the electronic device 201 of FIG. 2, the electronic device 301 of FIG. 3, or the electronic device 401 of FIGS. 4A and 4B) may receive a plurality of key inputs including a first key input, a second key input, and a third key input from the user. According to an embodiment, the input module may include a key matrix including a plurality of rows, a plurality of columns, and a plurality of physical keys respectively connected to the plurality of rows and the plurality of columns. For example, the key input may correspond to an input in which the user physically presses a physical key included in the input module.

According to an embodiment, in operation 620, the input module may determine whether a plurality of received key inputs correspond to a specified condition. For example, the specified condition may correspond to a case in which at least one of a plurality of received key inputs includes a key input causing a ghost phenomenon. According to one embodiment, the input module may determine whether three physical keys of four physical keys designated by two rows of a plurality of rows and two columns of a plurality of columns are in the on state by a key input received from the user. For example, the first key input and the second key input may be key inputs (e.g., a key input that is input before a key input causing a ghost phenomenon) that do not correspond to a specified condition, and the third key input may be a key input (e.g., a key input that causes a ghost phenomenon) that corresponds to a specified condition. In an embodiment, the input module may perform operation 630 when a plurality of received key inputs correspond to a specified condition. In another example, the input module may perform operation 640 when a plurality of received key inputs do not correspond to a specified condition.

According to an embodiment, in operation 630, the input module may determine a key value corresponding to at least one key input among a plurality of received key inputs, based on a result of learning the key input pattern of the user using the artificial intelligence model. For example, the input module may determine a key value corresponding to a third key input corresponding to a specified condition, based on a result of learning the key input pattern of the user using the artificial intelligence model. According to an embodiment, in operation 630, the input module may determine a key value corresponding to at least one key input among the received key inputs, by using the artificial intelligence model (e.g., at least one of the first artificial intelligence model 423 or the second artificial intelligence model 414 of FIG. 4A). For example, the input module of the electronic device may determine a key value corresponding to a key input last (e.g., a third input) input based on an order received from the user by using the second artificial intelligence model to which the weight received from a processor (e.g., the processor 120 of FIG. 1, the first processor 210 of FIG. 2, the processor 330 of FIG. 3, or the processor 420 of FIG. 4A) is applied. According to an embodiment, the input module does not request the user to input at least one key again, and may determine a key value corresponding to at least one key input (e.g., the third received key input), based on the result of learning the key input pattern of the user.

According to an embodiment, in operation 640, the input module may transfer key values corresponding to a plurality of key inputs received from the user to the processor. In an embodiment, the input module may transfer a key value corresponding to a third key input (e.g., a key input that causes a ghost phenomenon among a plurality of key inputs) determined (or predicted) through the artificial intelligence model in operation 630 to the processor. In an embodiment, the input module may transfer key values corresponding to each of the first key input and the second key input (e.g., a key input received prior to a key input that causes a ghost phenomenon among a plurality of key inputs) to the processor. For example, the key values corresponding to the first key input and the second key input may be key values corresponding to each of the switches changed from an off state to an on state by the corresponding key inputs.

According to an embodiment, in operation 650, the input module may receive a weight from the processor and may apply the received weight to the second artificial intelligence model 414.

Figure 7:
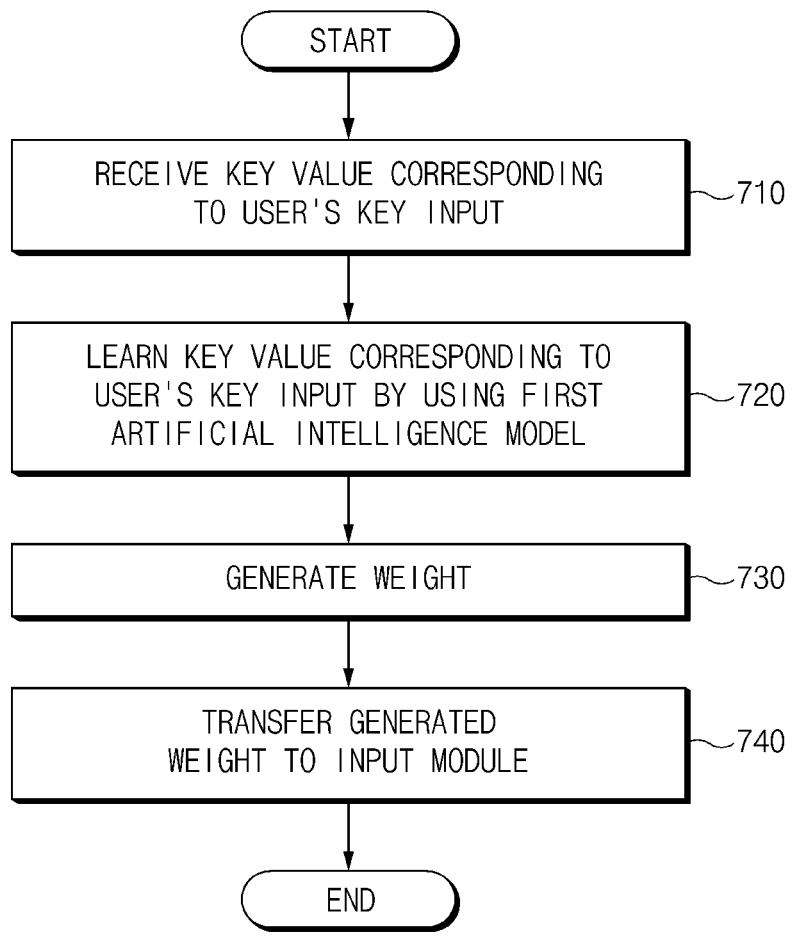
FIG. 7 is a flowchart illustrating an operation method of a processor of an electronic device according to an embodiment of the disclosure.

FIG. 7 is a flowchart illustrating an operation method of a processor of an electronic device, according to an embodiment of the disclosure.

Referring to FIG. 7, according to an embodiment, in operation 710, a processor (e.g., the processor 120 of FIG. 1, the first processor 210 of FIG. 2, the processor 330 of FIG. 3, or the processor 420 of FIG. 4A) of an electronic device (e.g., the electronic device 101 of FIG. 1, the electronic device 201 of FIG. 2, the electronic device 301 of FIG. 3, or the electronic device 401 of FIGS. 4A and 4B) may receive (or recognize) a key value corresponding to the key input of the user from the user.

According to an embodiment, in operation 720, the processor may learn a key value corresponding to the key input of the user by using a first artificial intelligence model (e.g., the first artificial intelligence model 423 of FIG. 4A). For example, the processor may learn the key input pattern of the user in a normal time (e.g., in a normal state) by using the first artificial intelligence model. For example, the first artificial intelligence model may include a recurrent neural network model.

According to an embodiment, in operation 730, the processor may generate a weight by using the first artificial intelligence model. For example, the weight may include a value for determining a key value corresponding to at least one key input among the received key inputs when the key input of the user corresponds to a specified condition.

According to an embodiment, in operation 740, when the received key input corresponds to a specified condition, the processor may apply the weight generated in operation 730 to a second artificial intelligence model (e.g., the second artificial intelligence model 414 of FIG. 4A). For example, the second artificial intelligence model may include a recurrent neural network model. For example, the second artificial intelligence model of the input module may be a model for determining a key value corresponding to at least one key input among the received key inputs.

According to an embodiment of the disclosure, a method of operating an electronic device (e.g., the electronic device 101 of FIG. 1, the electronic device 201 of FIG. 2, the electronic device 301 of FIG. 3, or the electronic device 401 of FIGS. 4A and 4B) includes receiving a plurality of key inputs including a first key input, a second key input, and a third key input from a user through an input module (e.g., the input module 150 of FIG. 1, the input module 220 of FIG. 2, the input module 310 of FIG. 3, or the input module 410 of FIGS. 4A and 4B) of the electronic device, recognizing whether the received plurality of key inputs correspond to a specified condition, and determining a key value corresponding to at least one key input among the plurality of key inputs based on a result of learning a key input pattern of the user by using an artificial intelligence model, based on that the received plurality of key inputs correspond to the specified condition.

According to an embodiment, the input module may include a plurality of physical keys that are arranged in a matrix form including a plurality of rows and a plurality of columns.

According to an embodiment, the recognizing may include recognizing that key inputs correspond to the specified condition, based on that the first key input, the second key input, and the third key input are the key inputs corresponding to three physical keys among four physical keys designated by a first row and a second row of the plurality of rows and a first column and a second column of the plurality of columns.

According to an embodiment, the plurality of physical keys may include a first physical key, a second physical key, a third physical key, and a fourth physical key, and the recognizing may include obtaining a first key value corresponding to the first physical key based on that the first physical key corresponding to the first key input is turned on, obtaining a second key value corresponding to the second physical key based on that the second physical key corresponding to the second key input is turned on in a state in which the first physical key is turned on, and recognizing that key inputs correspond to the specified condition based on that the third physical key corresponding to the third key input is turned on in a state in which the first physical key and the second physical key are turned on, and the determining may include determining the key value corresponding to the third key input based on the result of learning using the artificial intelligence model, among a third key value corresponding to the third physical key or a fourth key value corresponding to the fourth physical key.

According to an embodiment, each of the first physical key, the second physical key, the third physical key, and the fourth physical key may include a switch that controls electrical signals transferred through two rows selected from among the plurality of rows and two columns selected from among the plurality of columns.

According to an embodiment, the artificial intelligence model may include a recurrent neural network (RNN) model.

According to an embodiment, the determining may include determining a key value corresponding to a third received key input among the first key input, the second key input, and the third key input, based on the result of learning using the artificial intelligence model.

According to an embodiment, the determining may include determining the key value, based on the result of learning using the artificial intelligence model, without re-receiving the at least one key input from the user.

According to an embodiment, the artificial intelligence model may include a first artificial intelligence model and a second artificial intelligence model, and the method may further include learning the key input pattern of the user by using the first artificial intelligence model, and generating a weight related to the specified condition, based on a result of learning using the first artificial intelligence model, and the determining may include determining the key value corresponding to the at least one key input through the second artificial intelligence model to which the generated weight is applied.

According to an embodiment, the determining may include generating a weight based on the result of learning the key input pattern of the user by using the artificial intelligence model, providing the generated weight to an external electronic device, and receiving the key value from the external electronic device, and the key value may include a value determined based on the result of learning the plurality of key inputs by using the artificial intelligence model included in the external electronic device and to which the weight is applied.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:
1. An electronic device comprising:
an input interface;
a memory; and
a processor operatively connected to the input interface and the memory, and
wherein the memory includes instructions that, when executed by the processor, cause the processor to:
receive a plurality of key inputs including a first key input, a second key input, and a third key input from a user through the input interface,
recognize whether the received plurality of key inputs correspond to a specified condition,
learn a key input pattern of the user by using an artificial intelligence model,
generate a weight related to the specified condition, based on a result of learning using the artificial intelligence model, and
determine a key value corresponding to at least one key input among the plurality of key inputs to which the generated weight is applied, based on that the received plurality of key inputs correspond to the specified condition,
wherein the artificial intelligence model includes a first artificial intelligence model and a second artificial intelligence model, and
wherein the memory further includes instructions, when executed by the processor, cause the processor to:
learn the key input pattern of the user by using the first artificial intelligence model, generate the weight related to the specified condition based on a result of learning using the first artificial intelligence model, and
determine the key value corresponding to the at least one key input through the second artificial intelligence model to which the generated weight is applied.

2. The electronic device of claim 1, wherein the input interface includes a plurality of physical keys that are arranged in a matrix form including a plurality of rows and a plurality of columns.

3. The electronic device of claim 2, wherein the instructions, when executed by the processor, further cause the processor to recognize that key inputs correspond to the specified condition, when the first key input, the second key input, and the third key input are the key inputs corresponding to three physical keys among four physical keys designated by a first row and a second row of the plurality of rows and a first column and a second column of the plurality of columns.

4. The electronic device of claim 2,
wherein the plurality of physical keys include a first physical key corresponding to the first key input, a second physical key corresponding to the second key input, a third physical key corresponding to the third key input, and a fourth physical key,
wherein each of the first physical key, the second physical key, the third physical key, and the fourth physical key includes a switch configured to control electrical signals transferred through two rows selected from among the plurality of rows and two columns selected from among the plurality of columns, and
wherein the instructions, when executed by the processor, further cause the processor to:
obtain a first key value corresponding to the first physical key based on that the switch included in the first physical key is turned on,
obtain a second key value corresponding to the second physical key based on that the switch included in the second physical key is turned on in a state in which the first physical key is turned on,
recognize that key inputs correspond to the specified condition based on that the switch included in the third physical key is turned on in a state in which the switch included in the first physical key and the switch included in the second physical key are turned on, and
determine the key value corresponding to the third key input based on the result of learning using the artificial intelligence model, among a third key value corresponding to the third physical key or a fourth key value corresponding to the fourth physical key.

5. The electronic device of claim 1, wherein the artificial intelligence model includes a recurrent neural network (RNN) model.

6. The electronic device of claim 1, wherein the instructions, when executed by the processor, further cause the processor to determine a key value corresponding to a third received key input among the first key input, the second key input, and the third key input, based on the result of learning using the artificial intelligence model.

7. The electronic device of claim 1, wherein the instructions, when executed by the processor, further cause the processor to determine the key value, based on the result of learning using the artificial intelligence model, without re-receiving the at least one key input from the user.

8. The electronic device of claim 1,
wherein the instructions, when executed by the processor, further cause the processor to:
provide the generated weight to an external electronic device, and
receive the key value from the external electronic device, and
wherein the key value is a value determined based on the result of learning the plurality of key inputs by using the artificial intelligence model included in the external electronic device and to which the weight is applied.

9. A method of operating an electronic device comprising:
receiving a plurality of key inputs including a first key input, a second key input, and a third key input from a user through an input interface of the electronic device;
recognizing whether the received plurality of key inputs correspond to a specified condition;
learning a key input pattern of the user by using an artificial intelligence model;
generating a weight related to the specified condition, based on a result of learning using the artificial intelligence model; and
determining a key value corresponding to at least one key input among the plurality of key inputs to which the generated weight is applied based on that the received plurality of key inputs correspond to the specified conditions,
wherein the artificial intelligence model includes a first artificial intelligence model and a second artificial intelligence model,
wherein the key input pattern of the user is learned by using the first artificial intelligence model and the weight related to the specified condition is generated based on a result of learning using the first artificial intelligence model, and
wherein the key value corresponding to the at least one key input to which the generated weight is applied is determined by using the second artificial intelligence model.

10. The method of claim 9, wherein the input interface includes a plurality of physical keys that are arranged in a matrix form including a plurality of rows and a plurality of columns.

11. The method of claim 10, wherein the recognizing includes recognizing that inputs correspond to the specified condition, based on that the first key input, the second key input, and the third key input are the key inputs corresponding to three physical keys among four physical keys designated by a first row and a second row of the plurality of rows and a first column and a second column of the plurality of columns.

12. The method of claim 10,
wherein the plurality of physical keys includes a first physical key corresponding to the first key input, a second physical key corresponding to the second key input, a third physical key corresponding to the third key input, and a fourth physical key,
wherein each of the first physical key, the second physical key, the third physical key, and the fourth physical key includes a switch configured to control electrical signals transferred through two rows selected from among the plurality of rows and two columns selected from among the plurality of columns,
wherein the recognizing includes:
obtaining a first key value corresponding to the first physical key based on that the switch included in the first physical key is turned on, obtaining a second key value corresponding to the second physical key based on that the switch included in the second physical key is turned on in a state in which the switch included in the first physical key is turned on, and recognizing that key inputs correspond to the specified condition based on that the switch included in the third physical key is turned on in a state in which the switch included in the first physical key and the switch included in the second physical key are turned on, and wherein the determining includes determining the key value corresponding to the third key input based on the result of learning using the artificial intelligence model, among a third key value corresponding to the third physical key or a fourth key value corresponding to the fourth physical key.

13. The method of claim 9, wherein the artificial intelligence model includes a recurrent neural network (RNN) model.

14. The method of claim 9, wherein the determining of the key value includes determining a key value corresponding to a third received key input among the first key input, the second key input, and the third key input, based on the result of learning using the artificial intelligence model.

15. The method of claim 9, wherein the determining of the key value includes determining the key value, based on the result of learning using the artificial intelligence model, without re-receiving the at least one key input from the user.

16. The method of claim 9,
wherein the determining of the key value comprises:
providing the generated weight to an external electronic device, and
receiving the key value from the external electronic device, and
wherein the key value is a value determined based on the result of learning the plurality of key inputs by using the artificial intelligence model included in the external electronic device and to which the weight is applied.

* * * * *